United States Patent [19]

Fujinami

[11] Patent Number: 5,537,148
[45] Date of Patent: Jul. 16, 1996

[54] VIDEO AND AUDIO DATA DEMULTIPLEXER HAVING CONTROLLED SYNCHRONIZING SIGNAL

[75] Inventor: Yasushi Fujinami, Kanagawa, Japan

[73] Assignee: Sony Corporation, Tokyo, Japan

[21] Appl. No.: 456,228

[22] Filed: May 31, 1995

Related U.S. Application Data

[63] Continuation of Ser. No. 138,927, Oct. 18, 1993, abandoned.

[30] Foreign Application Priority Data

Oct. 16, 1992 [JP] Japan .................................. 4-304946
Sep. 3, 1993 [JP] Japan .................................. 5-219460

[51] Int. Cl.⁶ .............................. H04N 7/13; H04N 7/12; H04N 11/02; H04N 11/04
[52] U.S. Cl. .............................. 348/473; 348/12; 370/112
[58] Field of Search .................................. 348/473, 471, 348/422, 512, 513, 516, 423; 358/337, 341, 342, 343, 339, 319, 320; 370/100.1, 105.1, 105.2, 106, 48, 112, 105.3; 375/117; H04N 7/13, 7/12, 11/02, 11/04

[56] References Cited

U.S. PATENT DOCUMENTS

| | | | |
|---|---|---|---|
| 3,065,302 | 11/1962 | Kaneko | 370/105.2 |
| 3,274,340 | 9/1966 | Balderston et al. | 370/112 |
| 3,419,679 | 12/1968 | Elvis et al. | 375/117 |
| 4,635,248 | 1/1987 | Yoshida | 370/48 |
| 4,740,962 | 8/1988 | Kish, III | 370/105.3 |
| 5,337,334 | 8/1994 | Molloy | 370/105.3 |

Primary Examiner—James J. Groody
Assistant Examiner—Nina M. West
Attorney, Agent, or Firm—Limbach & Limbach

[57] ABSTRACT

When the decoding of video data is repeatedly started and interrupted, a data demultiplexer prevents a video synchronizing signal from being discontinued and hence prevents a displayed image from being disturbed immediately after the video data is decoded. When a data demultiplexing start time SCR and a decoding start time DTSV are read from a multiplexed bit stream, an initial STC value: initial_STC is calculated according to the equation:

$$\text{initial\_STC} = \text{SCR} - (Pp - ((\text{DTSV} - \text{SCR}) + \text{VIDEO\_DECODE\_DELAY})\% \, Pp)$$

where VIDEO_DECODE_DELAY represents a time, which is known, from the start of decoding of video data to the start of display of an image, Pp the frame period of a vertical synchronizing signal, and % an operator indicative of the remainder produced by the division of a previous value by a subsequent value. The time STC whose initial value is initial_STC is measured in synchronism with the video synchronizing signal. When the time STC is equalized to the data demultiplexing start time SCR, the data demultiplexing is started. When the time STC is equalized to the decoding start time DTSV, the data decoding is started.

16 Claims, 9 Drawing Sheets

| FIG. I(A) | FIG. I(B) |

| FIG. 6(A) | FIG. 6(B) |

5,537,148

VIDEO AND AUDIO DATA DEMULTIPLEXER HAVING CONTROLLED SYNCHRONIZING SIGNAL

This is a continuation of application Ser. No. 08/138,927, filed on Oct. 18, 1993, now abandoned.

BACKGROUND OF THE INVENTION

1. Field of the Invention

The present invention relates to a data demultiplexer, and more particularly to a data demultiplexer for reproducing and separating video and audio data that are recorded in a time-division multiplex fashion on a recording medium such as an optical disk, for example.

2. Description of the Related Art

Figure 3:
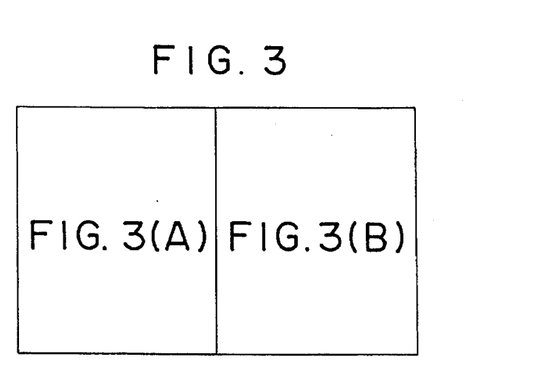
FIGS. 3A and 3B are block diagram of a conventional data demultiplexer.
Figure 3A:
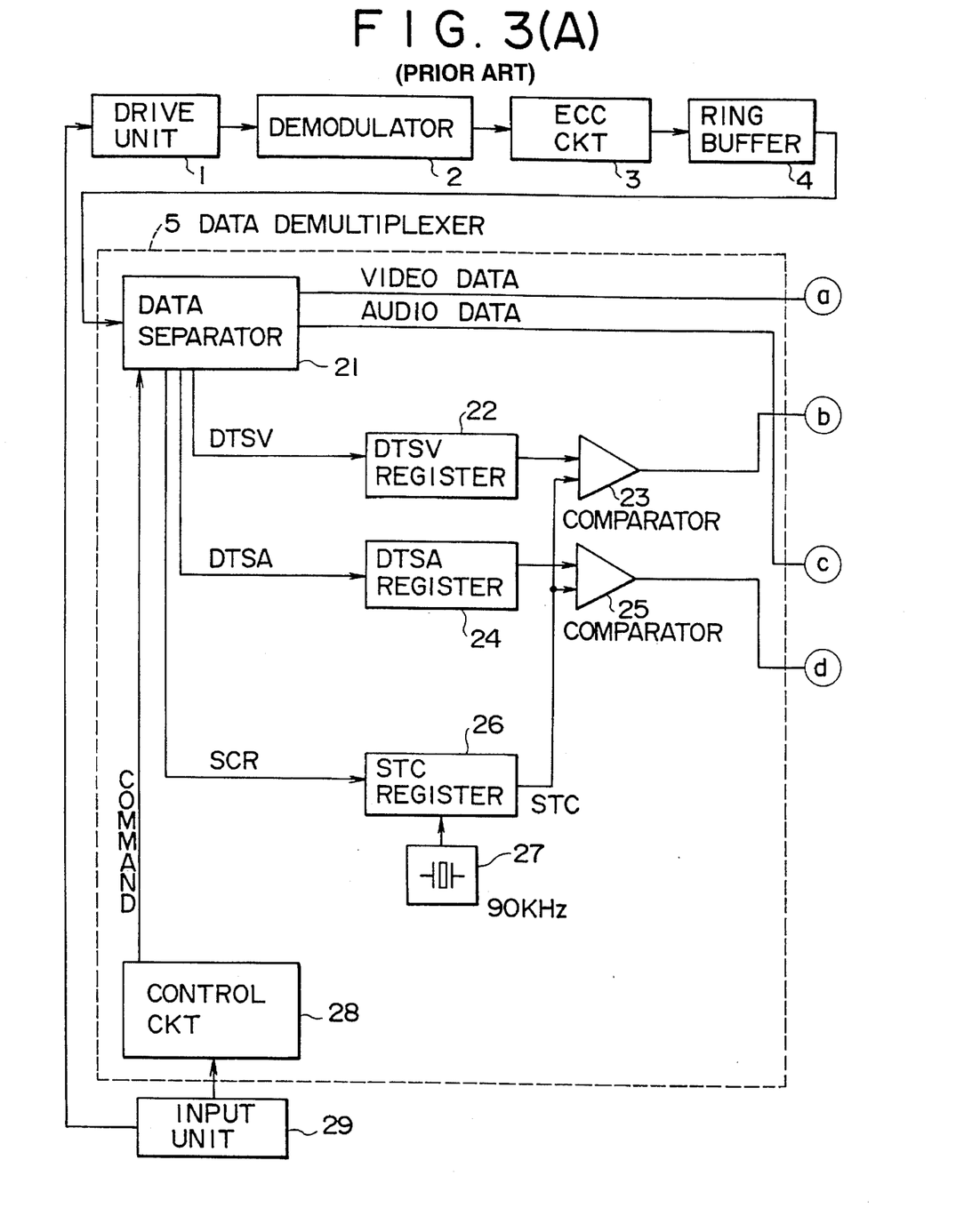
Figure 3B:
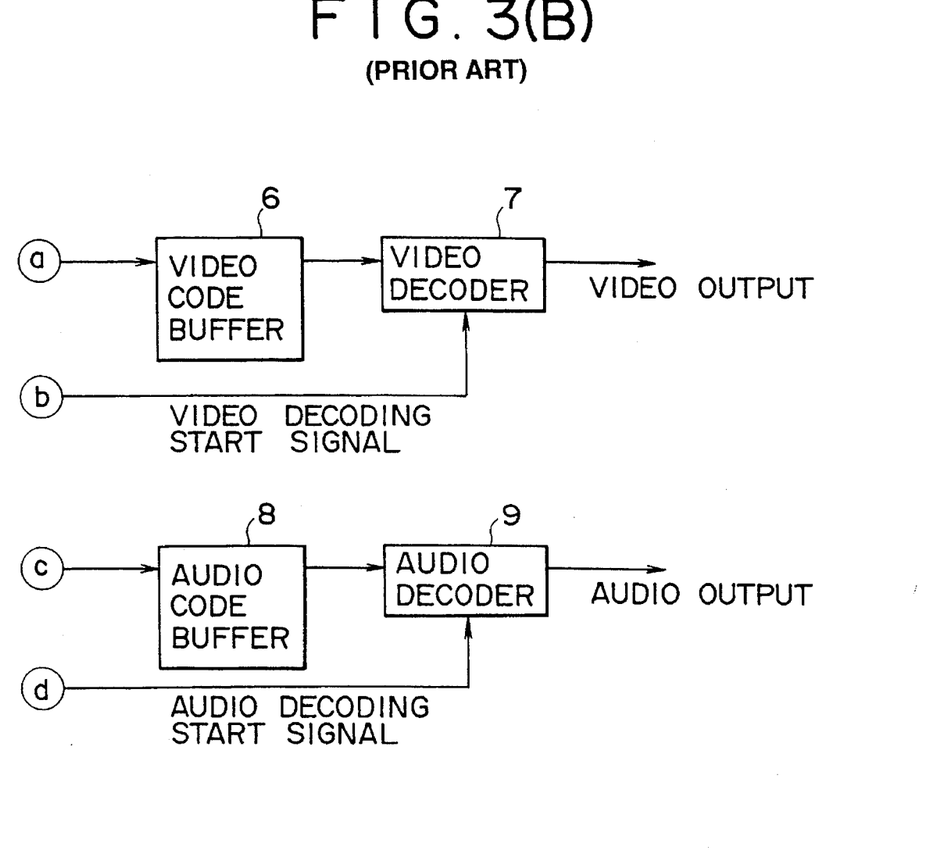

FIGS. 3A and 3B of the accompanying drawings illustrates in block form a conventional data demultiplexer and associated circuits. As shown in FIGS. 3A and 3B, a drive unit 1 reproduces data recorded on a built-in optical disk (not shown). The optical disk stores video and audio data that are recorded in a time-division multiplex fashion. The reproduced data outputted from the drive unit 1 is supplied to and demodulated by a demodulator 2. Errors contained in the demodulated data outputted from the demodulator 2 are detected and corrected by an ECC (Error Correcting Code) circuit 3, which supplies error-corrected data to a ring buffer 4. The ring buffer 4 stores a predetermined amount of supplied data, and then outputs the stored data to a data demultiplexer 5.

The data demultiplexer 5 has a data separator 21 for separating video data and audio data from the data supplied from the ring buffer 4. Data separator 21 also acts to separate SCR (System Clock Reference) data as timing data, and DTS (Decoding Time Stamp) data in the form of video data (DTSV) and audio data (DTSA) from the data supplied from ring buffer 4.

The separated video data is supplied to a video code buffer 6 of an FIFO (First-In, First-Out) configuration. The separated audio data is supplied to an audio code buffer 8 of an FIFO configuration. The SCR data is supplied to and stored in an STC (System Time Clock) register 26. The STC register 26 counts clock pulses having a frequency of 90 kHz which are outputted from a clock generator 27, and increments the stored data to generate an STC signal.

The DTSV and DTSA data are supplied to and stored in respective DTSV, DTSA registers 22, 24. The DTSV and DTSA data stored in the respective DTSV, DTSA registers 22, 24 are supplied to respective comparators 23, 25 for comparison with the STC signal outputted from the STC register 26. The data demultiplexer 5 also has a control circuit 28 comprising a CPU or the like for controlling the data separator 21 based on commands that are inputted from an input unit 29 in response to operations made by the user.

The video data stored in the video code buffer 6 is read and supplied to a video decoder 7. The video decoder 7 decodes the supplied video data into a video signal which is outputted to a circuit (not shown). The video decoder 7 is supplied with a video decoding start signal outputted from the comparator 23.

Similarly, the audio data stored in the audio code buffer 8 is read and supplied to an audio decoder 9. The audio decoder 9 decodes the supplied audio data into an audio signal which is outputted to a circuit (not shown). The audio decoder 9 is supplied with an audio decoding start signal outputted from the comparator 25.

Operation of the conventional data demultiplexer 5 will be described below with reference to FIG. 5 of the accompanying drawings. When the user operates the input unit 29 to issue a command to start reproducing data recorded on the built-in optical disk, the drive unit 1 reproduces the recorded data. The reproduced data outputted from the drive unit 1 is supplied to the demodulator 2 which demodulates the supplied data. The demodulated data is supplied to the ECC circuit 3 for detecting and correcting errors contained in the demodulated data. The error-corrected data is then supplied through the ring buffer 4 to the data separator 21 of the data demultiplexer 5.

Figure 4:
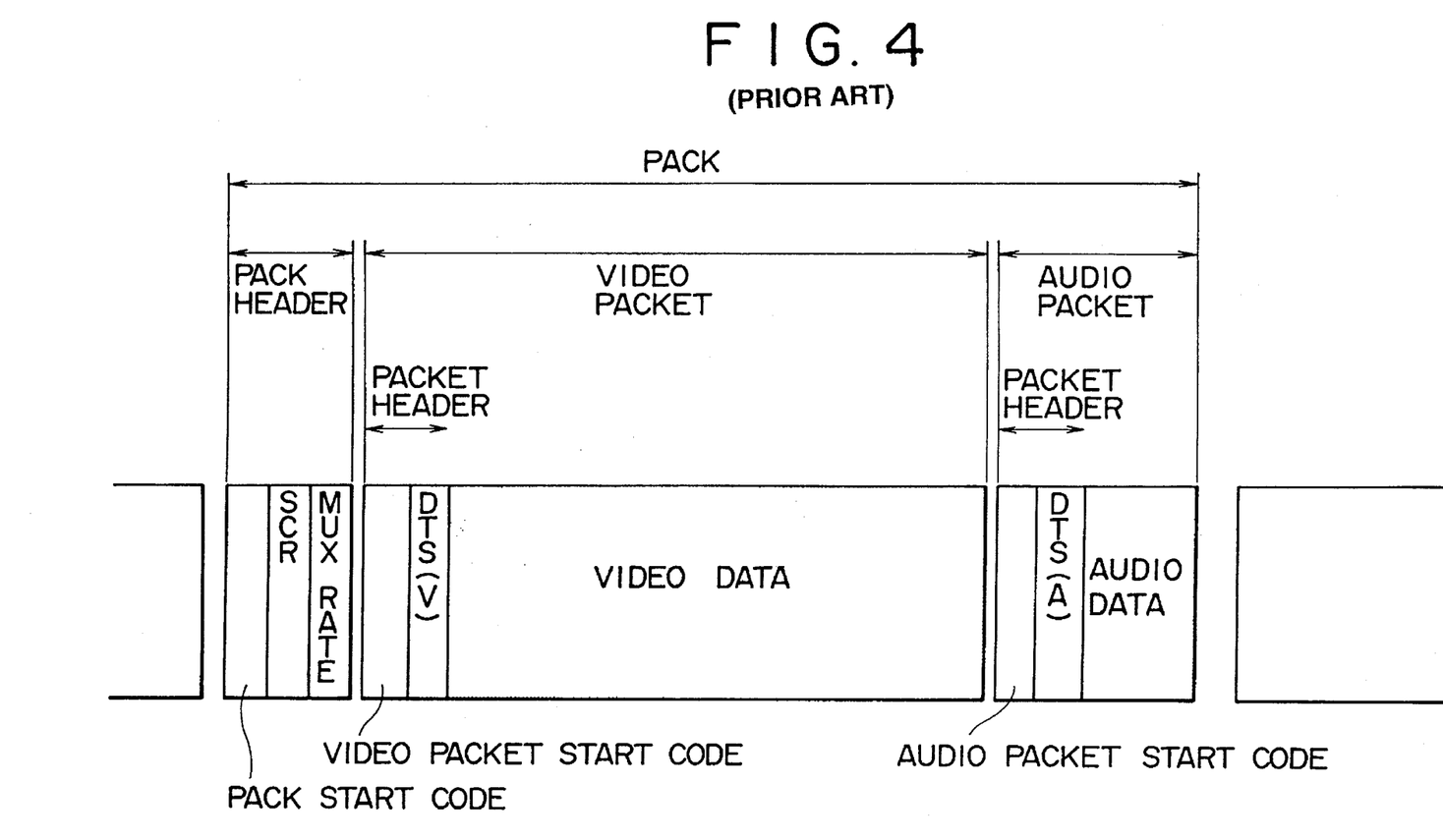
FIG. 4 is a diagram showing the format of a multiplexed bit stream used in the conventional data demultiplexer shown in FIGS. 3A and 3B.

The data supplied to the data demultiplexer 5 has a format stipulated as shown in FIG. 4 of the accompanying drawings, for example. The data format is stipulated as a multiplexed bit stream of MPEG (Moving Picture Expert Group) that is stipulated according to the ISO (International Standardization Organization), 11172. As shown in FIG. 4, the multiplexed bit stream is composed of one or more packs, each comprising one or more packets. The pack includes a pack header at its starting end which includes a pack start code indicative of a starting point of the pack an SCR, and a MUX RATE. The SCR represents the time at which its final byte is inputted to the data demultiplexer 5. The MUX RATE represents a transfer rate.

In the data format shown in FIG. 4, the pack header is followed by a video packet and an audio packet. Each of these video and audio packets includes a packet header at its starting end, which includes a video packet start code indicative of a starting point of the video packet or an audio packet start code indicative of a starting point of the audio packet, and a DTSV or DTSA indicative of the time at which the video or audio data starts to be decoded. The packet header is followed by video data or audio data.

Each of the timing data SCR, DTSV, DTSA is expressed by the count of clock pulses at the frequency of 90 kHz, and has a 33-bit effective number.

The data separator 21 is controlled by the control circuit 28 for separating video data and audio data from the data supplied from the ring buffer 4, and supplies the video data to the video code buffer 6 and the audio data to the audio code buffer 8, and also separating the SCR, DTSV, DTSA data and supplying them to the STC register 26, the DTSV register 22, and the DTSA register 24, respectively, which store the supplied data.

The STC register 26 stores the SCR data, subsequently counts clock pulses outputted from the clock generator 27, and increments the stored data in response to the clock pulses. The stored data is supplied as internal time data (STC) from the STC register 26 to the comparators 23, 25.

The SCR data corresponds to the time at which the data is supplied from the ring buffer 4 to the data demultiplexer 5 and starts to be demultiplexed thereby. That is, the SCR data corresponds to a time t1 in the timing chart shown in FIG. 5. The STC register 26 outputs time data (present time) indicative of the time that has elapsed from the time t1 to one of the input terminals of each of the comparators 23, 25.

The DTSV register 22 supplies the time data DTSV indicative of the time at which the video decoder 7 starts decoding the video data to the other input terminal of the comparator 23. When the present time outputted from the STC register 26 agrees with the decoding start time (DTSV) outputted from the DTSV register 22, i.e., at a time t2 in FIG. 5, the comparator 23 outputs a video decoding start signal to the video decoder 7. In response to the supplied video decoding start signal, the video decoder 7 reads one frame of stored video data from the video code buffer 6, and starts decoding the frame of video data.

Figure 5:
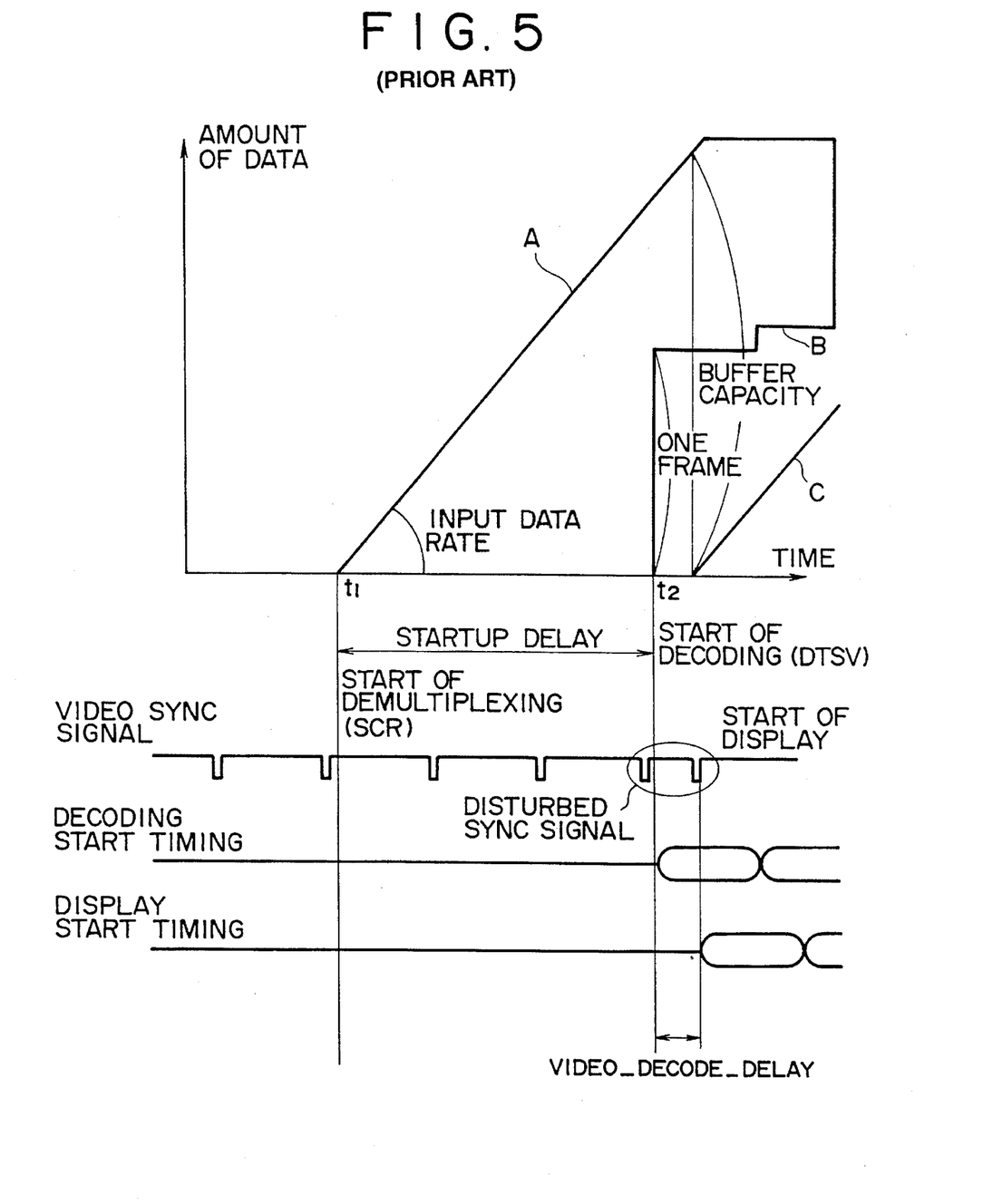
FIG. 5 is a timing chart showing the manner in which the conventional data demultiplexer shown in FIGS. 3A and 3B operates.

In FIG. 5, the straight line A represents the state of writing the video data into the video code buffer 6, and its gradient represents the writing transfer rate. The polygonal line B represents the state of reading the video data from the video code buffer 6 into the video decoder 7. Therefore, the video data which remains stored in the video code buffer 6 is indicated by the shaded area. The straight line C represents the time by which the video data written in the video code buffer 6 at timing of the straight line A is required to be read. Other video data is written in the video code buffer 6 at the timing of the straight line C. The storage capacity of the video code buffer 6 is indicated by the vertical distance up to the straight lines A, C.

In response to the video decoding start signal, the video decoder 7 starts decoding the video data. When the video decoder 7 completes the decoding of the video data, i.e., upon elapse of a video decode delay (VIDEO_DECODE_DELAY) from the start of the decoding of the video data, the video decoder 7 generates a video synchronizing signal, and then outputs a video signal to the non-illustrated circuit for image display. Thus, after elapse of the video decode delay from the start of the decoding of the video data, an image represented by the video signal is displayed. Therefore, as shown in FIG. 5, the video synchronizing signal can be outputted at intervals different from those prior to the time t2.

Likewise, the comparator 25 outputs an audio decoding start signal when the present time outputted from the STC register agrees with the decoding start time, at which the audio data starts to be decoded, outputted from the DTSA register 24. In response to the supplied audio decoding start signal, the audio decoder 9 reads stored audio data from the audio code buffer 8, and starts decoding the audio data to generate an audio signal. Then, the audio decoder outputs the audio signal to the non-illustrated circuit for sound playback.

In the conventional data demultiplexer, each time the video decoder 7 starts decoding the video data, it generates a video synchronizing signal regardless of the video synchronizing signal that has been outputted so far, and outputs a video signal with the generated video synchronizing signal added thereto. Therefore, the video synchronizing signal tends to be disturbed after the video decoder 7 starts to decode the video data, with the result that the displayed image tends to become unsightly.

One solution would be to record a video signal decoded by the video decoder 7 in a new buffer connected to the video decoder 7, and read the video signal from the buffer in timed relationship to a video synchronizing signal supplied from an external source, so that video synchronizing signals can be supplied at regular intervals for stably displaying an image based on the video signal. However, the scale of the circuit required is increased because a large-capacity buffer is required to record a decoded video signal.

SUMMARY OF THE INVENTION

It is therefore an object of the present invention to provide a data demultiplexer which prevents a video synchronizing signal from being disturbed with the addition of a relatively small-scale circuit arrangement.

According to the present invention, there is provided a data demultiplexer for processing encoded video data and timing data that are contained in input data in time-division multiplex fashion, comprising separating means for separating the video data and timing data from the input data, decoding means for decoding the video data separated by the separating means, calculating means for calculating a decoding start time for the decoding means to decode the video data from the timing data separated by the separating means and a decoding time in which the video data is decoded by the decoding means, and timing means for measuring time in synchronism with a synchronizing signal in the video data and generating a start signal to cause the decoding means to start decoding the video data at the decoding start time calculated by the calculating means.

The timing means may comprise clock generating means for generating a clock signal having a predetermined frequency, and counting means for storing data corresponding to the decoding start time calculated by the calculating means and varying the stored data depending on the clock signal generated by the clock generating means.

The timing means measures time in synchronism with a video synchronizing signal, and a decoding start signal is applied to the decoding means at the decoding start time calculated by the calculating means. Therefore, the video synchronizing signal outputted by the decoding means is prevented from being discontinued.

Consequently, when the decoding of the video data is repeatedly started and interrupted, the data demultiplexer prevents the video synchronizing signal from being discontinued and hence prevents a displayed image from being disturbed immediately after the video data is decoded. The data demultiplexer is of a relatively small circuit scale.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Like or corresponding parts are denoted by like or corresponding reference numerals throughout views.

Figures 1, 1B:
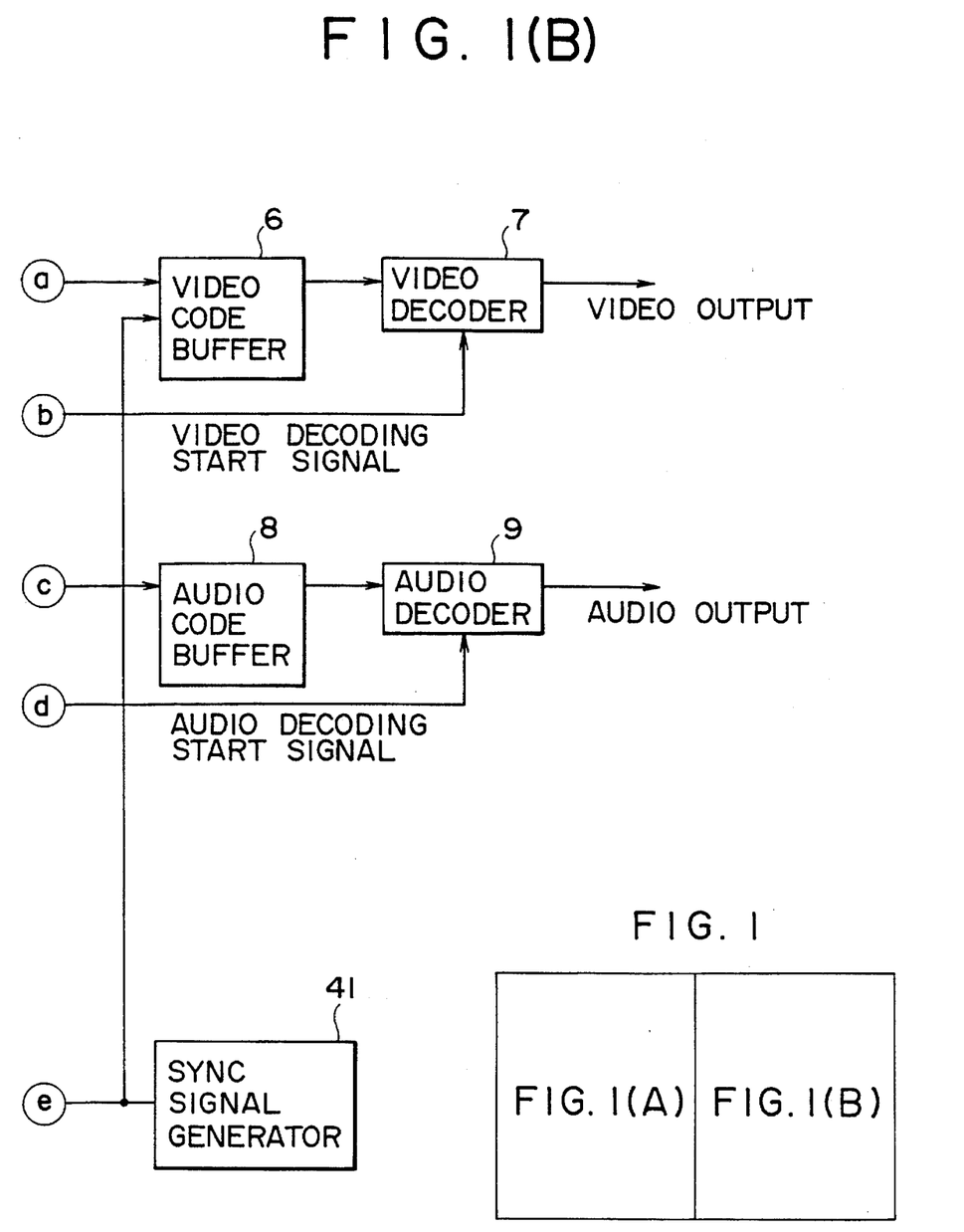
FIGS. 1A and 1B are block diagram of a data demultiplexer according to a first embodiment of the present invention.
Figure 1A:
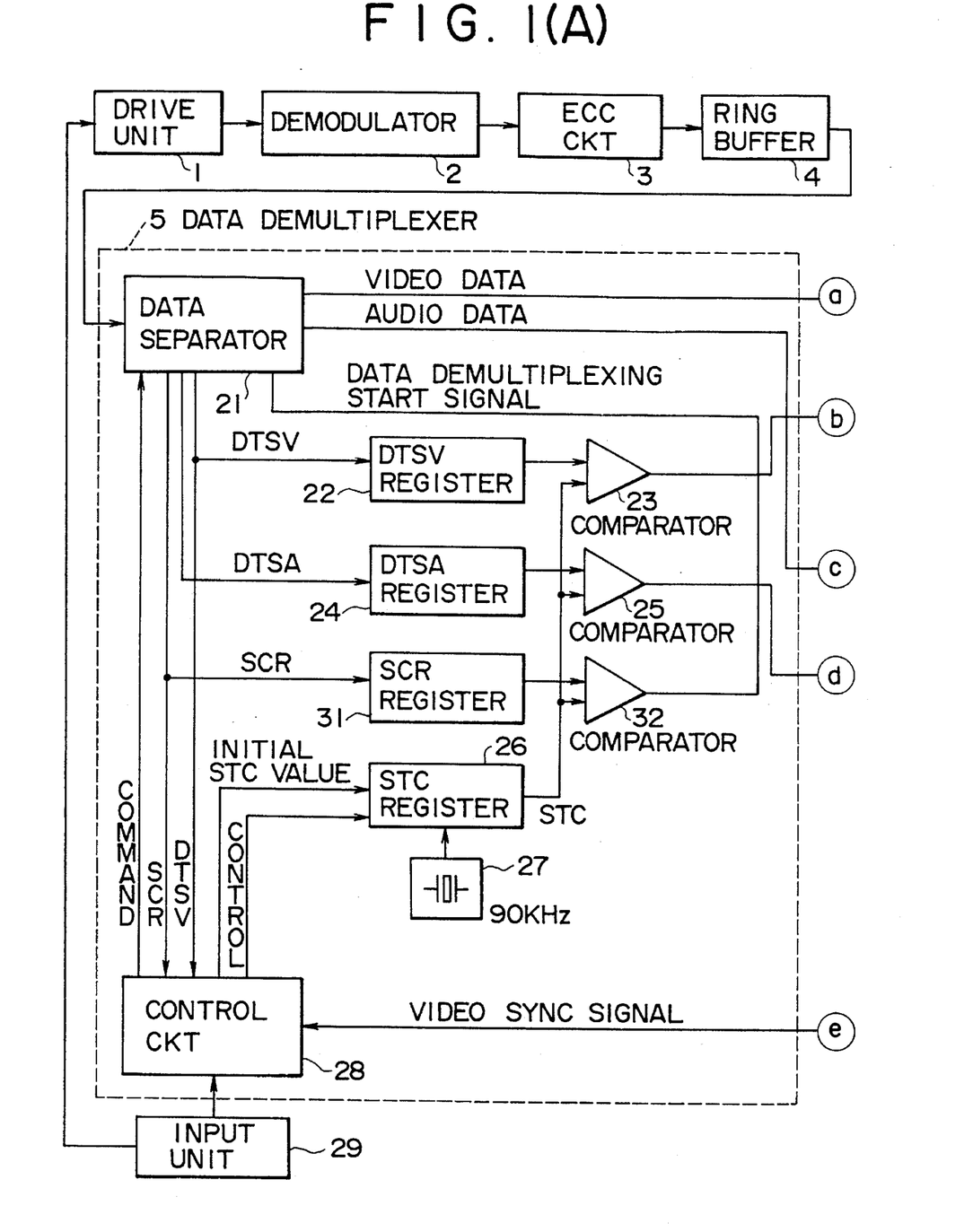

FIGS. 1A and 1B show a data demultiplexer, generally designated by the reference numeral 5, according to a first embodiment of the present invention. Those parts shown in FIGS. 1A and 1B which are identical to those shown in FIGS. 3A and 3B are denoted by identical reference numerals, and will not be described in detail below.

As shown in FIGS. 1A and 1B, the data demultiplexer 5 includes a data separator 21, a DTSV register 22, a DTSA register 24, comparators 23, 25, an STC register 26, a clock generator 27, a control circuit 28, an SCR register 31, and a comparator 32. The SCR register 31 is supplied with SCR data separated by the data separator 21.

The control circuit 28 is supplied with SCR and DTSV data separated by the data separator 21. The control circuit 28 processes the supplied data, and supplies an initial STC value to the STC register 26, and outputs a control signal at a predetermined time to enable the STC register 26 to start counting clock pulses outputted from the clock generator 27. The STC register 26 supplies output STC data to the comparators 23, 25, 32. The comparator 32 supplies an output signal as a data demultiplexing start signal to the data separator 21.

The data demultiplexer 5 is associated with a drive unit 1, a demodulator 2, an ECC circuit 3, a ring buffer 4, a video code buffer 6, a video decoder 7, an audio code buffer 8, an audio decoder 9, and an input unit 29.

A synchronizing signal generator 41 for generating video synchronizing signals such as horizontal and vertical synchronizing signals to be added to a video signal is connected to supply the generated video synchronizing signals to the video code buffer 6 and the control circuit 28.

Operation of the data demultiplexer 5 will be described below.

When the user operates the input unit 29 to issue a command to start reproducing data recorded on the built-in optical disk, the drive unit 1 reproduces and supplies the recorded data to the demodulator 2 which demodulates the supplied data. The demodulated data is supplied to the ECC circuit 3 for detecting and correcting errors contained in the demodulated data. The error-corrected data is then supplied through the ring buffer 4 to the data separator 21 of the data demultiplexer 5. When the command to start reproducing the recorded data is issued from the input unit 29, the control circuit 28 puts the data separator 21 in an initial setting mode. In the initial setting mode, the data separator 21 separates SCR and DTSV data from the data supplied from the ring buffer 4, and outputs the separated SCR and DTSV data to the control circuit 28. After having outputted the separated SCR and DTSV data to the control circuit 28, the data separator 21 stops its operation.

At this time, the ring buffer 4 stores a pack of data including the SCR and DTSV data separated by the data separator 21.

Using the SCR and DTSV data supplied from the data separator 21, the control circuit 28 calculates an initial STC value: initial_STC according to the following equation:

$$\text{initial\_STC} = \text{SCR} - (\text{Pp} - ((\text{DTSV} - \text{SCR}) + \text{VIDEO\_DECODE\_DELAY})\% \text{ Pp}) \quad (1)$$

where Pp is the picture period corresponding to the frame period of a video synchronizing signal outputted from the synchronizing signal generator 41. The frame frequency is 29.97 Hz according to the NTSC system, and 25 Hz according to the PAL system. Therefore, in terms of the number of clock pulses at 90 kHz, the picture period is 3003 according to the NTSC system and 3600 according to the PAL system.

In the equation (1), VIDEO_DECODE_DELAY represents a video decode delay corresponding the difference between the time at which the video data starts to be decoded by the video decoder 7 and the time at which the video signal starts to be displayed. The video decode delay is of a known value inherent in the video decoder 7 and stored in advance in the control circuit 28. According to a compression process such as MPEG or the like, a delay corresponding to one picture occurs with respect to I picture (Intra Picture: an intraframe-coded image) or P picture (Predicted Picture: an image that is predicted from a previous (past) image and interframe-coded), but no delay is ideally generated with respect to B picture (Bidirectional Picture: an image that is predicted from previous and subsequent images and interframe-coded). Actually, however, a slight delay occurs with respect to B picture.

In the equation (1), % means an operator indicating the remainder produced when the quotient resulting from the division of a previous term by a subsequent term is set to an integer.

Figure 2:
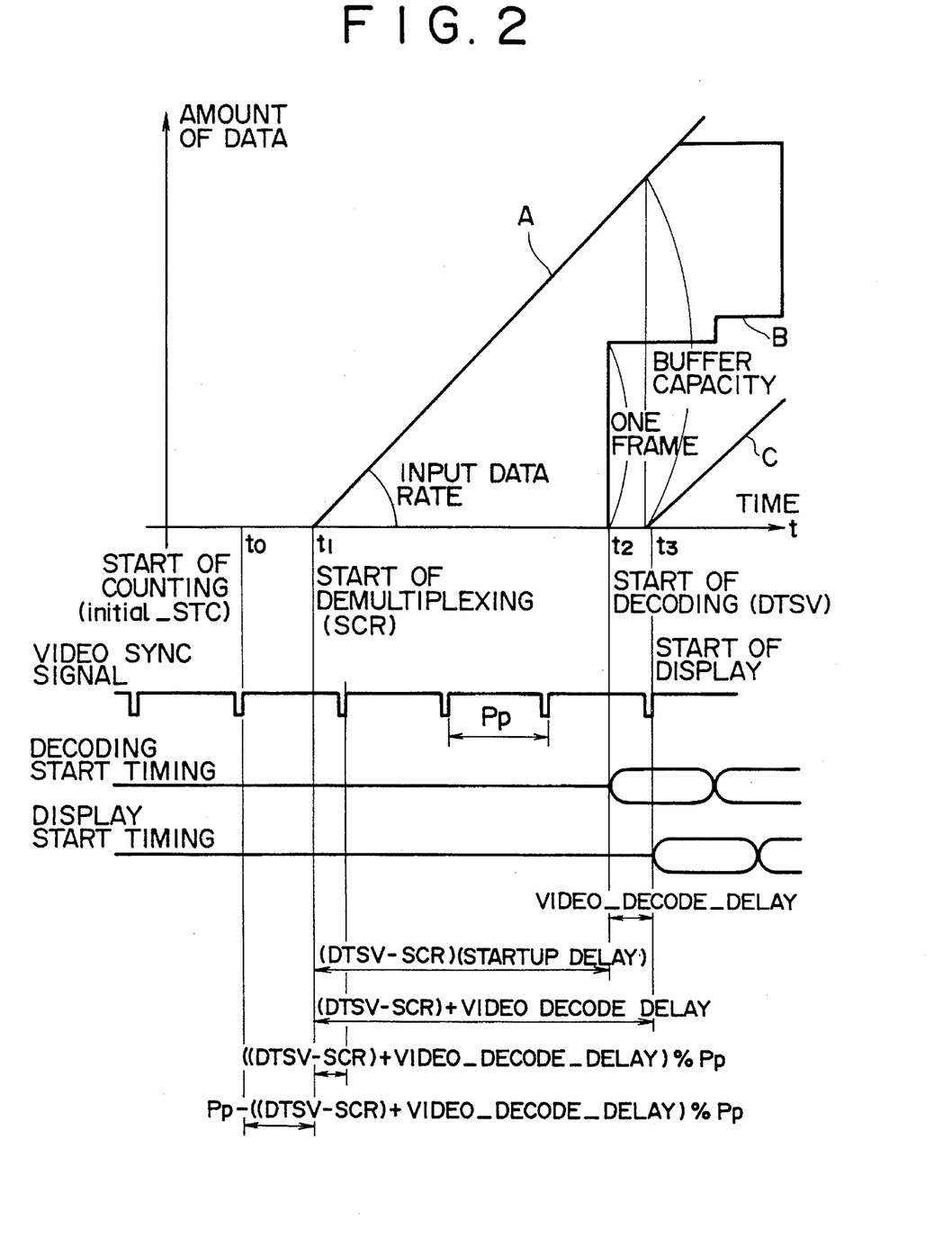
FIG. 2 is a timing chart showing the manner in which the data demultiplexer shown in FIG. 1 operates.

As shown in the timing chart of FIG. 2, to synchronize the display start time with the video synchronizing signal outputted from the synchronizing signal generator 41, the decoding start time (=DTSV) may be shifted ahead of the video synchronizing signal by the time corresponding to VIDEO_DECODE_DELAY.

In the equation (1), DTSV−SCR is the difference between the data demultiplexing start time SCR (t1) at which the data starts to be demultiplexed and the data decoding start time DTSV (t2) at which the video data starts to be decoded, and is called a startup delay. The time (t3−t1) from the data demultiplexing start time SCR (t1) to the display start time (t3) can be expressed as follows:

$$(\text{DTSV} - \text{SCR}) + \text{VIDEO\_DECODE\_DELAY} \quad (2)$$

In the equation (2), (DTSV−SCR)+VIDEO_DECODE_DELAY)% Pp represents the remainder produced when the time from the start of data demultiplexing to the display start time is divided by the picture period Pp. In order to synchronize the display start time with the video synchronizing signal, the data demultiplexing start time (=SCR) may be shifted ahead of the video synchronizing signal by the value of (DTSV−SCR)+VIDEO_DECODE_DELAY)% Pp.

Therefore, Pp−((DTSV−SCR)+VIDEO_DECODE_DELAY)% Pp in the equation (1) corresponds to the time (t1−t0) from the time (t1) of the SCR data to the time (t0) of a preceding video synchronizing signal. The value produced by subtracting Pp−((DTSV−SCR)+VIDEO_DECODE_DELAY)% Pp from the SCR (t1) is set to the initial STC value: initial_STC(t0) as indicated by the equation (1). Alternatively, the value produced by subtracting a multiple by a natural number of the picture period Pp may be set to the initial STC value: initial_STC(t0).

After the initial STC value has been set, the STC register 26 starts counting clock pulses that are outputted at 90 kHz from the clock generator 27 under the control of the control circuit 28. As shown in the timing chart of FIG. 2, the control circuit 28 controls the STC register 26 to starts clock pulses in synchronism with the video synchronizing signal inputted to the control circuit 28. The STC register 26 increments the initial STC value each time it counts a clock pulse, and outputs the incremented STC value as a present time STC to the comparators 23, 25, 32.

When the data separator 21 enters the initial setting mode, the SCR and DTSV data are stored respectively in the SCR register 31 and the DTSV register 22. The comparator 32 generates and outputs a data demultiplexing start signal to the data separator 21 when the present time STC outputted from the STC register 26 is equalized to the SCR data indicative of the data demultiplexing start time which is stored in the SCR register 31.

At the time t1 in FIG. 2, the data separator 21 is restarted in response to the data demultiplexing start signal, and reads the data from the ring buffer 4, separates and supplies video data to the video code buffer 6, and also separates and supplies audio data to the audio code buffer 8. When the data separator 21 detects DTSA data from the packet header in an audio packet, the data separator 21 separates and supplies the DTSA data to the DTSA register 24, which stores the supplied DTSA data.

From the time t1 in FIG. 2, the video data starts to be written in the video code buffer 6. When the present time STC is equalized to the data decoding start time DTSV (t2 in FIG. 2) stored in the DTSV register 22, the comparator 23 outputs a video decoding start signal to the video decoder 7. In response to the video decoding start signal, the video decoder 7 reads one frame of video data from the video code buffer 6, and starts decoding the frame of video data.

Upon elapse of the video decode delay from the start of data decoding, i.e., at the time t3 in FIG. 2, the video decoder 7 completes the decoding of the video data, and outputs a video signal. Since the video synchronizing signal is supplied from the synchronizing signal generator 41 to the video code buffer 6 just when the video decode delay elapses, the video decoder 7 outputs the video signal with the video synchronizing signal added thereto to a non-illustrated circuit for image display.

Similarly, when the present time STC is equalized to the data decoding start time DTSA stored in the DTSA register 24, the comparator 25 generates and outputs an audio decoding start signal to the audio decoder 9. In response to the audio decoding start signal, the audio decoder 9 reads audio data from the audio code buffer 8, and starts decoding the audio data to generate an audio signal. The audio decoder 9 outputs the generated audio signal to a non-illustrated circuit for sound playback.

In the above operation, the STC register 26 increments the stored data when it counts clock pulses from the clock generator 27. However, the STC register 26 may decrement the stored data when it counts clock pulses from the clock generator 27.

Figures 6, 6B:
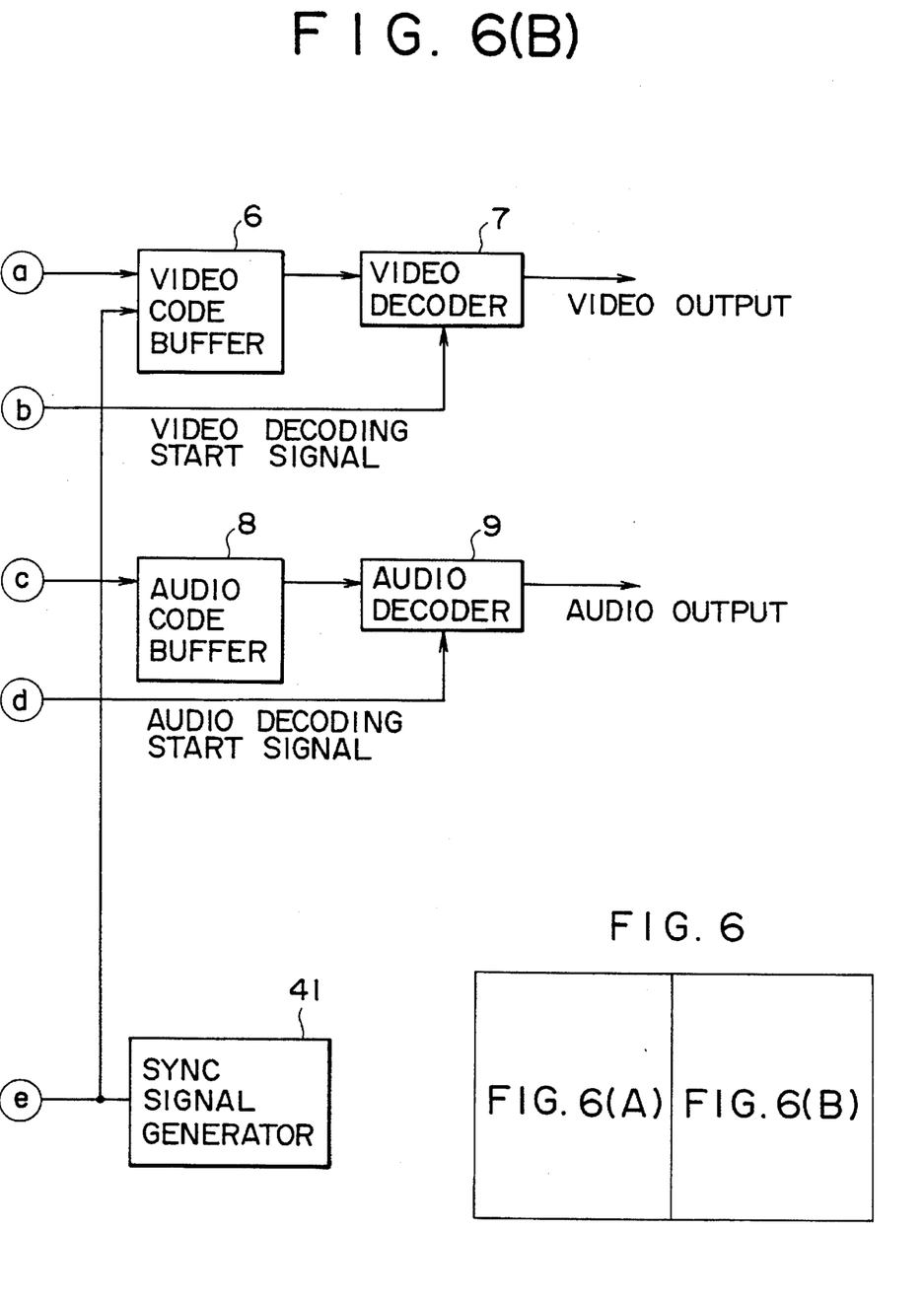
FIGS. 6A and 6B are block diagram of a data demultiplexer according to a second embodiment of the present invention.
Figure 6A:
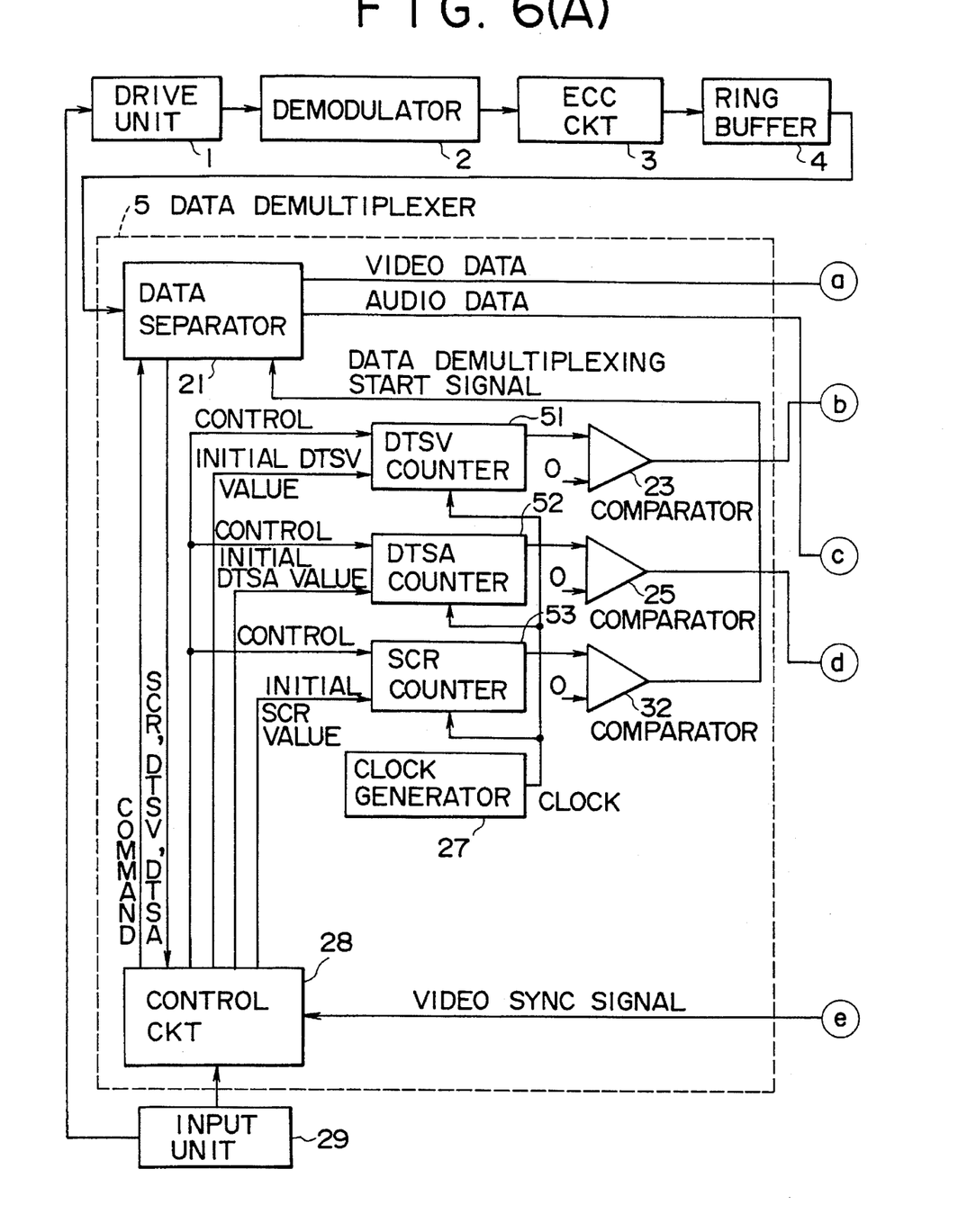

FIGS. 6A and 6B show a data demultiplexer 5 according to a second embodiment of the present invention. Those parts shown in FIGS. 6A and 6B which are identical to those shown in FIGS. 1A and 1B are denoted by identical reference numerals, and will not be described in detail below. The data demultiplexer 5 shown in FIGS. 6A and 6B differs from the data demultiplexer 5 shown in FIGS. 1A and 1B in that the data demultiplexer 5 has a DTSV counter 51 instead of the DTSV register 22, a DTSA counter 52 instead of the DTSA register 24, an SCR counter 53 instead of the SCR register 31, and the STC register 26 is eliminated.

The control circuit 28 is supplied with SCR, DTSV, DTSA data separated by the data separator 21. The control circuit 28 processes these SCR, DTSV, DTSA data, and supplies an initial DTSV value to the DTSV counter 51, an initial DTSA value to the DTSA counter 52, and an initial SCR value to the SCR counter 53. The control circuit 28 outputs a control signal at a predetermined time to enable the DTSV counter 51, the DTSA counter 52, and the SCR counter 53 to start counting clock pulses outputted from the clock generator 27. The comparators 23, 25, 32 compare respective output signals from the DTSV counter 51, the DTSA counter 52, and the SCR counter 53 with 0.

Operation of the data demultiplexer 5 will be described below. The circuits associated with the data demultiplexer 5 operate in the same manner as described above with reference to FIGS. 1A and 1B. When a command to start reproducing recorded data is issued from the input unit 29, the control circuit 28 puts the data separator 21 in an initial setting mode. In the initial setting mode, the data separator 21 separates SCR, DTSV, DTSA data from the data supplied from the ring buffer 4, and outputs the separated SCR, DTSV, DTSA data to the control circuit 28. Thereafter, the data separator 21 stops its operation.

Using the SCR, DTSV, DTSA data supplied from the data separator 21, the control circuit 28 calculates an initial SCR value: initial_SCR, an initial DTSV value: initial_DTSV, and an initial DTSA value: initial_DTSA according to the following equations:

$$\text{initial\_SCR} = Pp - ((DTSV - SCR) \quad (3)$$
$$\qquad\qquad + \text{VIDEO\_DECODE\_DELAY}) \,\%\, Pp),$$

$$\text{initial\_DTSV} = \text{initial\_SCR} + DTSV - SCR \quad (4)$$
$$\qquad\qquad = Pp - (DTSV - SCR)$$
$$\qquad\qquad + \text{VIDEO\_DECODE\_DELAY}) \,\%\, Pp)$$
$$\qquad\qquad + DTSV - SCR,$$

$$\text{initial\_DTSA} = \text{initial\_SCR} + DTSA - SCR \quad (5)$$
$$\qquad\qquad = Pp - (DTSV - SCR)$$
$$\qquad\qquad + \text{VIDEO\_DECODE\_DELAY}) \,\%\, Pp)$$
$$\qquad\qquad + DTSA - SCR$$

In the equation (3), the initial SCR value: initial_SCR represents the time (t1–t0) from the counting start time (t0) to the SCR (t1) in the timing chart of FIG. 2. In the equation (4), the initial DTSV value: initial_DTSV represents the time (t2–t0) from the counting start time (t0) to the DTSV (t2) in the timing chart of FIG. 2. In the equation (5), the initial DTSA value: initial_DTSA is calculated in the same manner as the initial DTSV value: initial_DTSV. Each of the initial SCR value: initial_SCR, the initial DTSV value: initial_DTSV, and the initial DTSA value: initial_DTSA may be set to a multiple by a natural number of the picture period Pp.

After the above initial values have been set, the control circuit 28 produces a control signal to permit counting operation in synchronism with the video synchronizing signal inputted to the control circuit 28. When the control signal to permit counting operation is produced, the DTSV counter 51, the DTSA counter 52, and the SCR counter 53 decrement their counts each time a clock pulse is outputted from the clock generator 27, and output their counts to the comparators 23, 25, 32, respectively.

When the count outputted from the SCR counter 53 is equalized to 0, then the comparator 32 generates and outputs a data demultiplexing start signal to the data separator 21. At the time t1 in FIG. 2, the data separator 21 is restarted in response to the supplied data demultiplexing start signal, and reads the data from the ring buffer 4, separates and supplies video data to the video code buffer 6, and also separates and supplies audio data to the audio code buffer 8.

When the count outputted from the DTSV counter 51 is equalized to 0, the comparator 23 generates and outputs a video decoding start signal to the video decoder 7. At the time t2 in FIG. 2, the video decoder 7 reads one frame of video data from the video code buffer 6 in response to the video decoding start signal. At the time t3 in FIG. 2, the video decoder 7 completes the decoding of the video data, and outputs a video signal. Since the video synchronizing signal is supplied from the synchronizing signal generator 41 to the video code buffer 6 just when the video decode delay elapses, the video decoder 7 outputs the video signal with the video synchronizing signal added thereto to a non-illustrated circuit for image display.

Similarly, when the count outputted from the DTSA counter 52 is equalized to 0, the comparator 25 generates and outputs an audio decoding start signal to the audio decoder 9. In response to the audio decoding start signal, the audio decoder 9 reads audio data from the audio code buffer 8, and starts decoding the audio data to generate an audio signal. The audio decoder 9 outputs the generated audio signal to a non-illustrated circuit for sound playback.

While the video synchronizing signal outputted from the synchronizing signal generator 41 is supplied to the control circuit 28 and the video code buffer 6 in the above embodiments, the same operation may be carried out when a video synchronizing signal supplied from an external device is supplied to the control circuit 28 and the video code buffer 6.

Although certain preferred embodiments of the present invention have been shown and described in detail, it should be understood that various changes and modifications may be made therein without departing from the scope of the appended claims.

What is claimed is:

1. A data decoding method for decoding input data, the input data including a system clock reference (SCR) value, a decoding time stamp for video (DTSV) value, and video data encoded in time-division multiplex fashion, the method comprising:

separating the SCR value and the DTSV value from the input data;

storing the separated SCR value;

storing the separated DTSV value;

determining an initial system time clock (STC) value from the separated SCR value, the separated DTSV value, and a time period for a frame of the video data;

incrementing the initial STC value, wherein the STC value is incremented upon an occurrence of a pulse of a clock signal having a predetermined frequency;

separating the encoded video data from the input data when the incremented STC value equals the stored SCR value;

storing the separated encoded video data; and decoding the stored, encoded video data when the incremented STC value equals the stored DTSV value.

2. The data decoding method of claim 1, wherein the step of determining an initial STC value further comprises:

determining the initial STC value from a video decode delay value, wherein the video decode delay value equals a time period between a time at which decoding of the stored video data begins and a time at which the decoded video data is displayed.

3. The data decoding method of claim 1, wherein the input data includes a decoding time stamp for audio data (DTSA) value and encoded audio data, and the method further comprises:

separating the DTSA value and the encoded audio data from the input data;

storing the separated DTSA value;

storing the separated encoded audio data; and decoding the stored, encoded audio data when the incremented STC value equals the stored DTSA value.

4. A data decoding method for decoding input data, the input data including a system clock reference (SCR) value, a decoding time stamp for video (DTSV) value, and video data encoded in time-division multiplex fashion, the method comprising:

separating the SCR value and the DTSV value from the input data;

determining an initial SCR value from the separated SCR value, the separated DTSV value, and a time period for a frame of the video data;

determining an initial DTSV value from the separated SCR value, the separated DTSV value, and the time period for the frame of the video data;

storing the initial SCR value;

storing the initial DTSV value;

decrementing the initial SCR value, wherein the initial SCR value is decremented upon an occurrence of a pulse of a clock signal having a predetermined frequency, and further, wherein the initial SCR value is decremented in synchronism with a synchronizing signal having a period equal to the time period of the frame of the video data;

decrementing the initial DTSV value, wherein the initial DTSV value is decremented upon an occurrence of a pulse of the clock signal, and further, wherein the initial DTSV value is decremented in synchronism with the synchronizing signal;

separating the encoded video data from the input data when the decremented initial SCR value equals zero;

storing the separated encoded video data; and decoding the stored encoded video data when the decremented initial DTSV value equals zero.

5. The data decoding method of claim 4, wherein the step of determining the initial SCR value further comprises:

determining the initial SCR value from a video decode delay value, wherein the video decode delay value equals a time period between a time at which decoding of the stored video data begins and a time at which the decoded video data is displayed.

6. The data decoding method of claim 4, wherein the step of determining the initial DTSV further comprises:

determining the initial DTSV value from a video decode delay value, wherein the video decode delay value equals a time period between a time at which decoding of the stored video data begins and a time at which the decoded video data is displayed.

7. The data decoding method of claim 4, wherein the input data includes a decoding time stamp for audio (DTSA) value and encoded audio data, and the method further comprises:

separating the DTSA value and the encoded audio data from the input data;

determining an initial DTSA value from the separated SCR value, the separated DTSV value, the separated DTSA value, and a time period for a frame of the video data;

storing the initial DTSA value;

decrementing the initial DTSA value, wherein the initial DTSA value is decremented upon an occurrence of a pulse of a clock signal, and further, wherein the initial DTSA value is decremented in synchronism with the synchronizing signal;

storing the separated encoded audio data; and decoding the stored encoded audio data when the decremented DTSA value equals zero.

8. The data decoding method of claim 7, wherein the step of determining an initial DTSA value determines the initial DTSA from a video decode delay value, wherein the video decode delay value equals a time period between a time at which decoding of the stored video data begins and a time at which the decoded video data is displayed.

9. A data demultiplexer for processing input data, the input data including a system clock reference (SCR) value, a decoding time stamp for video (DTSV) value, and video data encoded in time-division multiplex fashion, the demultiplexer comprising:

means for separating the SCR value and the DTSV value from the input data;

means for storing the separated SCR value;

means for storing the separated DTSV value;

means for determining an initial system time clock (STC) value from the separated SCR value, the separated DTSV value, and a time period for a frame of the video data;

means for incrementing the initial STC value, wherein the STC value is incremented upon an occurrence of a pulse of a clock signal having a predetermined frequency;

clock means for generating the pulse of the clock signal used by the means for incrementing the initial STC;

means for separating the encoded video data from the input data when the incremented STC value equals the stored SCR value;

means for storing the separated encoded video data; and decoding means for decoding the stored, encoded video data when the incremented STC value equals the stored DTSV value.

10. The data demultiplexer of claim 9, wherein the means for determining an initial STC value further comprises:

means for determining the initial STC value from a video decode delay value, wherein the video decode delay value equals a time period between a time at which decoding of the stored video data begins and a time at which the decoded video data is displayed.

11. The data demultiplexer of claim 9, wherein the input data includes a decoding time stamp for audio data (DTSA) value and encoded audio data, and the demultiplexer further comprises:

means for separating the DTSA value and the encoded audio data from the input data;

means for storing the separated DTSA value;

means for storing the separated encoded audio data; and means for decoding the stored, encoded audio data when the incremented STC value equals the stored DTSA value.

12. A data demultiplexer for decoding input data, the input data including a system clock reference (SCR) value, a decoding time stamp for video (DTSV) value, and video data encoded in time-division multiplex fashion, the demultiplexer comprising:

means for separating the SCR value and the DTSV value from the input data;

means for determining an initial SCR value from the separated SCR value, the separated DTSV value, and a time period for a frame of the video data;

means for calculating an initial DTSV value from the separated SCR value, the separated DTSV value, and the time period for the frame of the video data;

means for storing the initial SCR value;

means for storing the initial DTSV value;

means for decrementing the initial SCR value, wherein the initial SCR value is decremented upon an occurrence of a pulse of a clock signal having a predetermined frequency and further, wherein the initial SCR value is decremented in synchronism with a synchronizing signal having a period equal to the time period of the frame of the video data;

means for decrementing the initial DTSV value, wherein the initial DTSV value is decremented upon a pulse of the clock signal, and further, wherein the initial DTSV value is decremented in synchronism with the synchronizing signal;

means for separating the encoded video data from the input data when the decremented initial SCR value equals zero;

means for storing the separated encoded video data; and decoding means for decoding the stored encoded video data when the decremented initial DTSV value equals zero.

13. The data demultiplexer of claim 12, wherein the means for determining the initial SCR value further comprises:

means for determining the initial SCR value from a video decode delay value, wherein the video decode delay value equals a time period between a time at which decoding of the stored video data begins and a time at which the decoded video data is displayed.

14. The data demultiplexer of claim 12, wherein the means for determining the initial DTSV further comprises:

means for determining the initial DTSV value from a video decode delay value, wherein the video decode delay value equals a time period between a time at which decoding of the stored video data begins and a time at which the decoded video data is displayed.

15. The data demultiplexer of claim 12, wherein the input data includes a decoding time stamp for audio (DTSA) value and encoded audio data, and the demultiplexer further comprises:

means for separating the DTSA value and the encoded audio data from the input data;

means for determining an initial DTSA value from the separated SCR value, the separated DTSV value, the separated DTSA value, and a time period for a frame of the video data;

means for storing the initial DTSA value;

means for decrementing the initial DTSA, wherein the initial DTSA value is decremented upon an occurrence of a pulse of a clock signal, and further, wherein the initial DTSA value is decremented in synchronism with the synchronizing signal;

means for storing the separated encoded audio data; and decoding means for decoding the stored encoded audio data when the decremented DTSA value equals zero.

16. The data demultiplexer of claim 15, wherein the means for determining an initial DTSA value determines the initial DTSA from a video decode delay value, wherein the video decode delay value equals a time period between a time at which decoding of the stored video data begins and a time at which the decoded video data is displayed.

* * * * *